(12) United States Patent
Isogai

(10) Patent No.: US 12,456,538 B2
(45) Date of Patent: Oct. 28, 2025

(54) SEMICONDUCTOR STORAGE DEVICE

(71) Applicant: SONY SEMICONDUCTOR SOLUTIONS CORPORATION, Kanagawa (JP)

(72) Inventor: Daishi Isogai, Kanagawa (JP)

(73) Assignee: SONY SEMICONDUCTOR SOLUTIONS CORPORATION, Kanagawa (JP)

( * ) Notice: Subject to any disclaimer, the term of this patent is extended or adjusted under 35 U.S.C. 154(b) by 122 days.

(21) Appl. No.: 18/261,631

(22) PCT Filed: Jan. 12, 2022

(86) PCT No.: PCT/JP2022/000708
§ 371 (c)(1),
(2) Date: Jul. 14, 2023

(87) PCT Pub. No.: WO2022/158349
PCT Pub. Date: Jul. 28, 2022

(65) Prior Publication Data
US 2024/0395354 A1 Nov. 28, 2024

(30) Foreign Application Priority Data
Jan. 22, 2021 (JP) .................. 2021-008944

(51) Int. Cl.
*G11C 29/56* (2006.01)

(52) U.S. Cl.
CPC .. *G11C 29/56008* (2013.01); *G11C 29/56016* (2013.01); *G11C 2029/5602* (2013.01)

(58) Field of Classification Search
CPC ........ G11C 29/56008; G11C 29/56016; G11C 2029/5602; G11C 29/42; G11C 29/44; H10D 84/00; H10D 84/038; G01R 31/28
See application file for complete search history.

(56) References Cited

U.S. PATENT DOCUMENTS

2005/0160332 A1* 7/2005 Hirabayashi ........... G11C 29/42
714/763
2005/0174863 A1 8/2005 Proll
(Continued)

FOREIGN PATENT DOCUMENTS

JP 11-066888 A 3/1999
JP 2000-276898 A 10/2000
(Continued)

OTHER PUBLICATIONS

International Search Report and Written Opinion of PCT Application No. PCT/JP2022/000708, issued on Mar. 8, 2022, 13 pages of ISRWO.

*Primary Examiner* — Mohammed A Bashar
(74) *Attorney, Agent, or Firm* — CHIP LAW GROUP

(57) ABSTRACT

There is provided a semiconductor storage device according to an embodiment includes a memory cell array including a plurality of memory cells; a read data output unit that outputs data read from the memory cell array to the outside with a bit width of m bits without changing the data; and a defect information obtaining unit that obtains defect information indicating a defect when the defect is detected in the data read from the memory cell array. The defect information obtaining unit outputs defect information, in which the number of defects in the data read from the memory cell array is 0 to n bits (n<m) bits, for outputting different values to the outside for each number of defects, with 2 to n bit values indicating 1-bit information, respectively.

13 Claims, 10 Drawing Sheets

(56) References Cited

U.S. PATENT DOCUMENTS

| | | | |
|---|---|---|---|
| 2015/0162099 A1* | 6/2015 | Jeong | G11C 29/42 714/719 |
| 2016/0203047 A1 | 7/2016 | No et al. | |
| 2018/0102183 A1* | 4/2018 | Shim | G11C 29/36 |

FOREIGN PATENT DOCUMENTS

| | | |
|---|---|---|
| JP | 2006-236551 A | 9/2006 |
| JP | 2007-280546 A | 10/2007 |
| JP | 2013-137843 A | 7/2013 |
| JP | 2018-195122 A | 12/2018 |
| JP | 2020-042869 A | 3/2020 |

\* cited by examiner

FIG.5

| NUMBER OF FAILS | A | B |
|---|---|---|
| 0 | pass | pass |
| 1 | fail | 1 |
| 2 | fail | 2 |
| 3 | fail | 3 |
| 4 | fail | overflow |
| 5 | fail | overflow |

FIG.7

| EXPECTED VALUE \ Data | 0 | 1 |
|---|---|---|
| 0 | pass | fail |
| 1 | fail | pass |

SEMICONDUCTOR STORAGE DEVICE

CROSS REFERENCE TO RELATED APPLICATIONS

This application is a U.S. National Phase of International Patent Application No. PCT/JP2022/000708 filed on Jan. 12, 2022, which claims priority benefit of Japanese Patent Application No. JP 2021-008944 filed in the Japan Patent Office on Jan. 22, 2021. Each of the above-referenced applications is hereby incorporated herein by reference in its entirety.

FIELD

The present disclosure relates to a semiconductor storage device.

BACKGROUND

In a semiconductor device including a plurality of memory banks, a case is considered in which a test operation for detecting a defect of a plurality of memory cell groups in each memory bank is performed. In this test operation, when a plurality of pieces of test data corresponding to a plurality of memory cell groups of each memory bank are output to the outside of the semiconductor device via a data output terminal without change, the test data is output by the number of the plurality of selected memory cell groups, and thus the test time increases.

In order to shorten this test time, Patent Literature 1 proposes a configuration including a determination circuit that determines a pass/a fail with respect to data read from a memory cell, and a circuit that combines determination data as a determination result by an inversion circuit and outputs the combined determination data as test data of a test result. According to the configuration proposed in Patent Literature 1, the test data is compressed for each memory cell group, and the determination data of each cell group is combined, so that the output test data can be suppressed to be equal to or less than the number of memory cell groups, and the test time can be shortened.

CITATION LIST

Patent Literature

Patent Literature 1: JP 2013-137843 A

SUMMARY

Technical Problem

In the configuration disclosed in Patent Literature 1, 0/1 determination of whether one or more bits fail or whether all bits pass is performed with respect to the test data read from the memory cell first, and data compression is performed on the determination result. However, in the configuration described in Patent Literature 1, all the bits are determined as a fail unless all the bits are determined as a pass, and the number of defects cannot be counted. Therefore, it is difficult to apply the configuration described in Patent Literature 1 to a memory in which pass determination of all the bits is not assumed.

An object of the present disclosure is to provide a semiconductor storage device compatible with a test for a memory on which pass determination of all bits is not assumed.

Solution to Problem

For solving the problem described above, a semiconductor storage device according to one aspect of the present disclosure has a memory cell array including a plurality of memory cells; a read data output unit that outputs data read from the memory cell array to the outside with a bit width of m bits without changing the data; and a defect information obtaining unit that obtains defect information indicating a defect when the defect is detected in the data read from the memory cell array, wherein the defect information obtaining unit outputs the defect information, in which the number of defects in the data read from the memory cell array is 0 to n bits (n<m) bits, for outputting different values to the outside for each number of defects, with 2 to n bit values indicating 1-bit information, respectively.

BRIEF DESCRIPTION OF DRAWINGS

FIG. 5 is a schematic diagram illustrating an example of test result data output according to the number of fails from a defect number counter according to the embodiment in comparison with test result data by a compression circuit according to the existing technology.

FIG. 7 is a schematic diagram illustrating a truth table based on expected values and data according to the embodiment.

DESCRIPTION OF EMBODIMENTS

Figure 1:
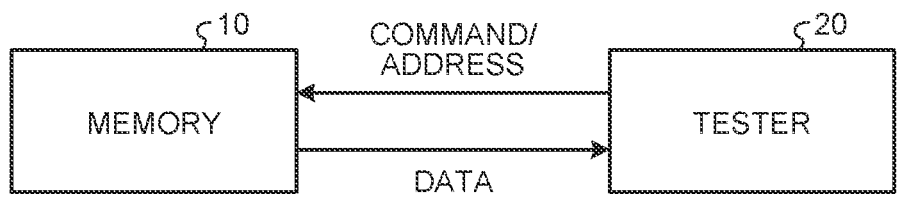
FIG. 1 is a schematic diagram schematically illustrating an inspection system of a memory to which the technology of the present disclosure is applicable.

Hereinafter, embodiments of the present disclosure are described in detail with reference to the drawings. Note that, in the following embodiment, the same parts are denoted by the same reference numerals, and redundant description are omitted.

Hereinafter, embodiments of the present disclosure are described in the following order.

1. Summary of the Disclosure
2. Existing Technology
3. Embodiments of the Present Disclosure
4. First Modification of Embodiment
4-1. First Example of First Modification of Embodiment
4-2. Second Example of First Modification of Embodiment
5. Second Modification of Embodiment

1. SUMMARY OF THE DISCLOSURE

First, the technology of the present disclosure is schematically described. FIG. 1 is a schematic diagram schematically illustrating an inspection system of a memory to which the technology of the present disclosure is applicable.

In FIG. 1, a memory 10 to be inspected according to the present disclosure includes a plurality of memory cells each serving as a unit of writing and reading data, and a cell array is configured for each predetermined number of memory cells among the plurality of memory cells. The memory 10 reads from and writes to the cell array with a data width of m bits. For example, the memory 10 can read and write data with a data width of 16 bits (m=16), 32 bits (m=32), 64 bits (m=64), or the like.

A tester 20 is connected to the memory 10. The tester 20 is connected to the memory 10 by, for example, bringing a probe or the like into contact with a terminal (pad) of the memory 10. The tester 20 transmits a command for instructing the memory 10 to perform writing or reading together with an address to perform writing or reading. The memory 10 measures the number of defects (the number of defective bits) of the data read in accordance with the command and the address transmitted from the tester 20.

The memory 10 outputs defect information indicating a defect to the tester 20 according to the measurement result of the number of defects of data. The defect information is information in which the number of defects of the read data is n (n<m) bits and which takes a different value for each number of defects. The defect information is transmitted to the tester 20 as two or more and less than m defect information signals each indicating 1-bit information.

As described above, the memory 10 according to the present disclosure outputs the defect information as a different value for each number of defects with n bits smaller than the data width (m bits) for reading and writing data. Therefore, it is possible to detect the number of defects up to the number that can be expressed by n bits, and it is possible to deal with a test for a memory on which pass determination of all bits is not assumed.

2. EXISTING TECHNOLOGY

Next, prior to the description of the embodiments of the present disclosure, an existing technology is described for easy understanding.

Figure 2A:
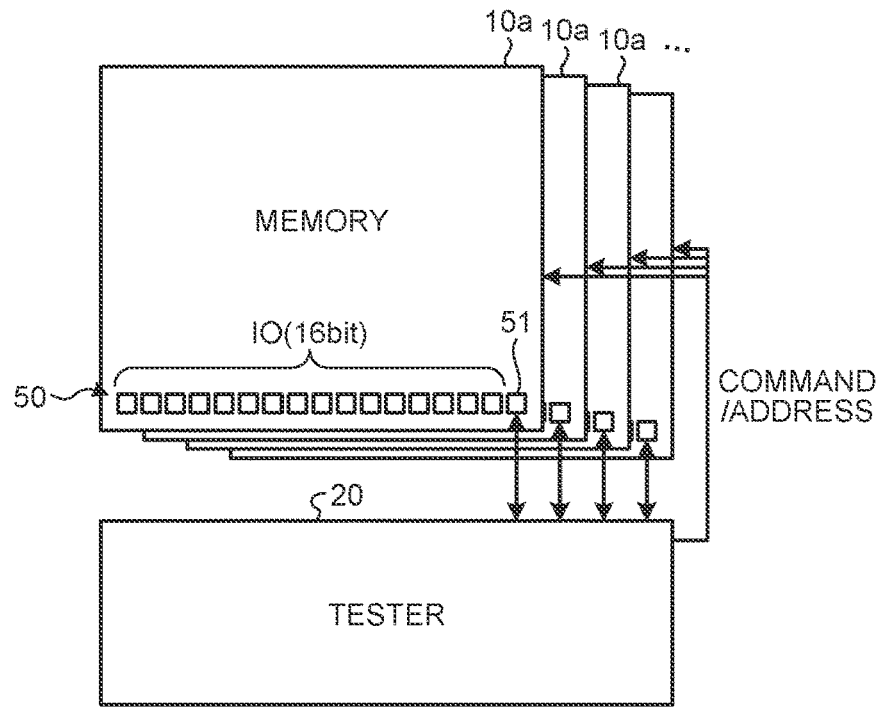
FIG. 2A is a schematic diagram schematically illustrating an inspection method of a memory according to an existing technology.

FIG. 2A is a schematic diagram schematically illustrating an inspection method of a memory according to the existing technology. In FIG. 2A, a plurality of memories 10a to be inspected according to the existing technology are connected to the tester 20. Here, each memory 10a is a dynamic random access memory (DRAM). In the example of FIG. 2A, each memory 10a includes a terminal group 50 including a plurality of terminals corresponding to input/output (IO) having a data width of 16 bits for reading and writing data. Further, each memory 10a includes a 1-bit test terminal 51 for outputting a test result.

The tester 20 transmits a command for instructing reading to each memory 10a together with a read address sequentially designated in an address unit of 16 bits corresponding to the data width of the IO, for example. In response to the command transmitted from the tester 20, each memory 10a outputs, to the test terminal 51, a 1-bit test result having a value of "0" when all bits in the memory pass, and a value of "1" when even one bit fails.

The tester 20 reads the 1-bit output of the test terminal 51 of each memory 10a. The pass/fail of each memory 10a can be known by the 1-bit output read by the tester 20. As described above, in the existing technology, the test result data of all the bits of the memory is compressed into 1-bit data, and a pass/a fail of the memory is determined, thereby earning the same number of measurements by the tester 20.

Figure 2B:
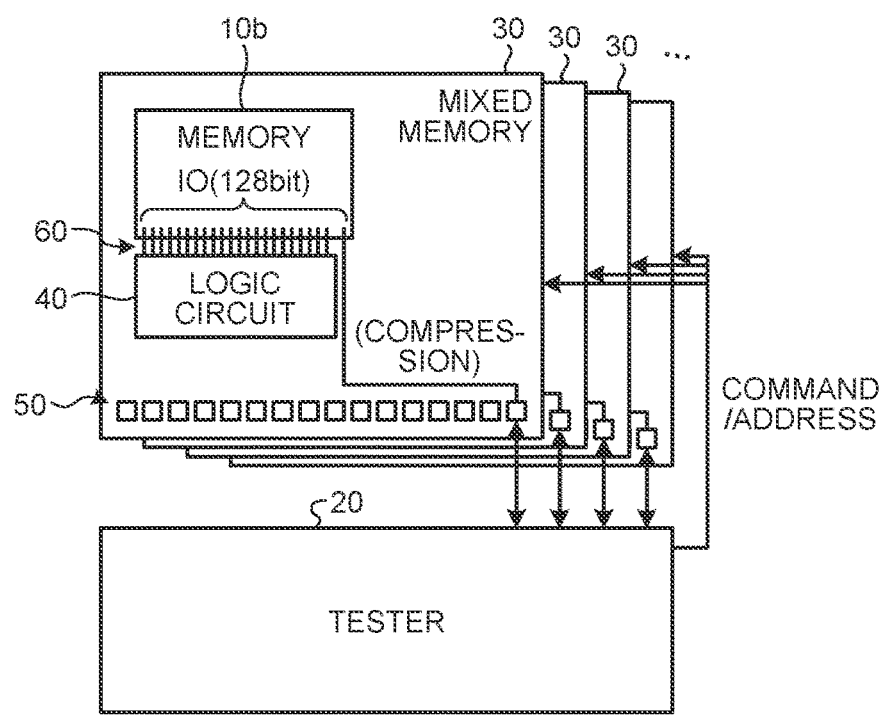
FIG. 2B is a schematic diagram schematically illustrating an inspection method of a memory for a mixed memory according to the existing technology.

FIG. 2B is a schematic diagram schematically illustrating an inspection method of the memory according to the existing technology for a mixed memory 30 in which a memory 10b that is a DRAM according to the existing technology and a logic circuit 40 that performs processing by using the memory 10b are mixed in one package. In the case of the mixed memory 30, since the memory 10b and the logic circuit 40 are directly connected in the package, an IO 60 for the logic circuit 40 of the memory b10 may have, for example, a large data width such as 128 bits.

As described above, in the mixed memory 30, since the data width of the IO 60 of the built-in memory 10b can be very large, the number of terminals necessary for connecting the tester 20 is extremely large in order to perform the inspection on all bits of the data width of the IO 60. Therefore, in the mixed memory 30, compression of the test result data is essential. In the example of FIG. 2B, the test result data compressed to 1 bit in the memory 10b is output to one terminal provided in the mixed memory 30.

Meanwhile, in recent years, a magnetoresistive random access memory (MRAM) or a resistive random access memory (ReRAM) has attracted attention owing to its high-speed operation speed, non-volatility, and the like.

Figure 3:
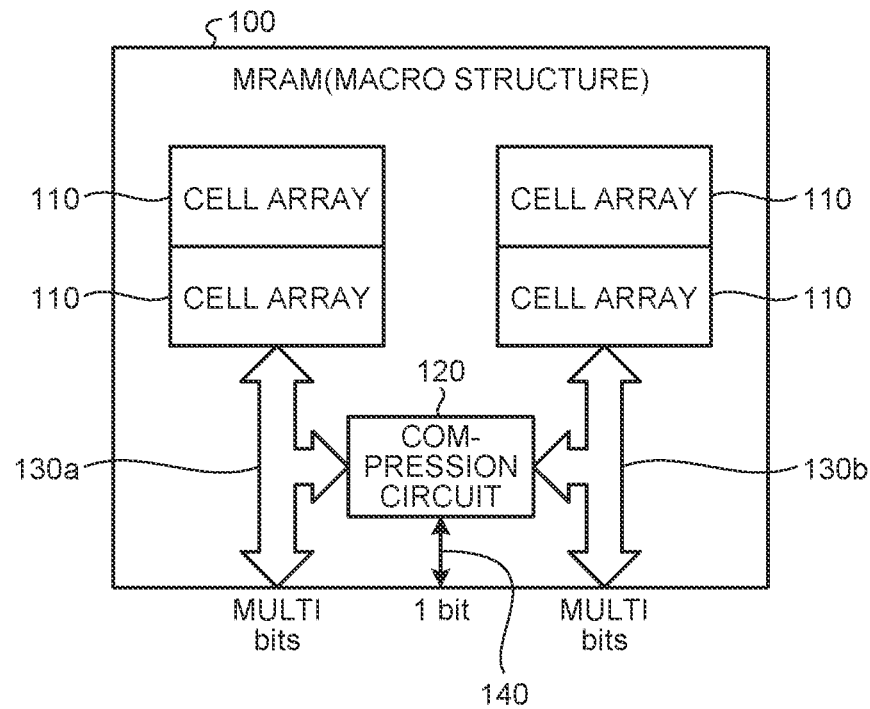
FIG. 3 is a schematic diagram schematically illustrating a macro structure of an MRAM according to the existing technology.

FIG. 3 is a schematic diagram schematically illustrating a macro structure of an MRAM as a semiconductor storage device according to the existing technology. In the following description, the MRAM having a macro structure is described as an MRAM unless otherwise specified. Note that the ReRAM can also have a similar configuration, and thus description thereof is omitted here.

In FIG. 3, an MRAM 100 includes a plurality of cell arrays 110 in which a plurality of memory cells are arranged in a lattice pattern and a compression circuit 120 that compresses test result data. In the example of FIG. 3, the two cell arrays 110 on the left side and the two cell arrays 110 on the right side of the figure are connected to terminals (not illustrated) by IOs to buses 130a and 130b having a multi-bit (for example, 32 bits) data width, respectively. Note that, in FIG. 3, signal lines and terminals for instructing commands and addresses from the tester 20 are omitted.

The buses 130a and 130b are also connected to the compression circuit 120. For example, the compression circuit 120 performs AND determination or NAND determination on each bit of data having a data width of 64 bits, which is the sum of 32 bits of the bus 130a and 32 bits of the bus 130b, and outputs 1-bit test result data. More specifically, the compression circuit 120 outputs a fail as test result data when even 1 bit of data includes a fail in 64-bit data and outputs a pass as test result data when no fail is included in 64-bit data. The 1-bit test result data output from the compression circuit 120 is output to the outside of the MRAM 100 via a signal line 140 having a 1-bit data width.

In the MRAM 100 and the ReRAM, a defect stochastically is generated, and there is a low probability that all bits of a plurality of addressed bits have a predetermined bit value. Therefore, in a test of the MRAM 100 or the ReRAM, it is difficult to compress measurement data by a method similar to that of the DRAM.

That is, in the configuration of FIG. 3 described above, even if only one of the plurality of memory cells included in each of the plurality of cell arrays 110 is defective, the test result data indicates a fail. Therefore, in the MRAM 100 and the ReRAM in which a defect stochastically is generated, the probability that the test result data will be a pass is extremely low, and it is difficult to perform an appropriate inspection. For example, in the MRAM 100 or the ReRAM, an error correction circuit that actually performs error correction by using an error correction code (ECC) is mounted, and defects of several bits can be corrected by the error correction circuit. Therefore, the test result data preferably has a configuration in which defects of several bits can be set as a pass.

3. EMBODIMENTS OF THE PRESENT DISCLOSURE

Figure 4:
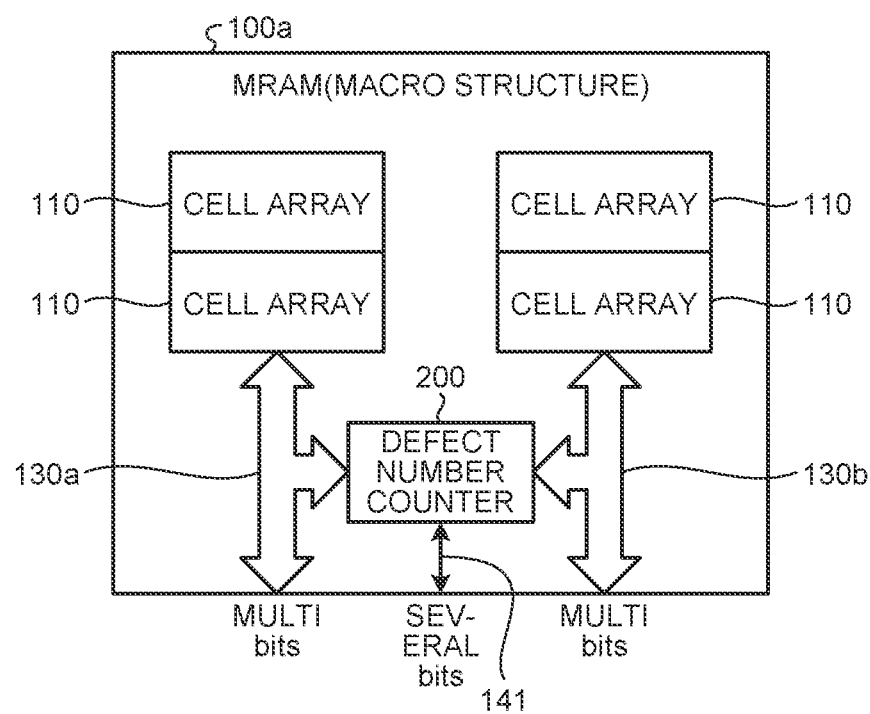
FIG. 4 is a block diagram illustrating a configuration of an example of an MRAM (macro structure) as a semiconductor storage device according to an embodiment.

Next, an embodiment of the present disclosure is described. FIG. 4 is a block diagram illustrating a configuration of an example of an MRAM (macro structure) as a semiconductor storage device according to the embodiment. In an MRAM 100a according to the embodiment illustrated in FIG. 4, a defect number counter 200 is provided instead of the compression circuit 120 with respect to the configuration of the MRAM 100 according to the existing technology illustrated in FIG. 3. Note that, in FIG. 4, signal lines and terminals for instructing commands and addresses from the tester 20 are omitted.

Note that an error correction circuit that performs error correction based on the ECC can be built in the MRAM 100a. The error correction circuit may be provided outside the MRAM 100a. The function of the error correction circuit is stopped during the test.

In the example of FIG. 4, in the same manner as in FIG. 3 described above, the two cell arrays 110 on the left side and the two cell arrays 110 on the right side of the figure are connected to terminals (not illustrated) by IOs to the buses 130a and 130b having a multi-bit (for example, 32 bits) data width, respectively. The data read from each cell array 110 is output from the corresponding terminal without being changed. The corresponding terminal and the IO function as a read data output unit that outputs data read from each cell array 110 to the outside. The buses 130a and 130b are also connected to a defect number counter 200.

For example, the defect number counter 200 counts the number of defective bits for data having a data width of 64 bits which is the sum of 32 bits of the bus 130a and 32 bits of the bus 130b. The defect number counter 200 obtains defect information indicating the number of counted defective bits (the number of defects). More specifically, the defect number counter 200 obtains defect information with a signal of 2 to n bits in which the number of defective bits of data read from the four cell arrays 110 is 0 to n bits and which is a value different for each number of defective bits. Here, a value n is a value that satisfies [n<m] with respect to a value m (for example, m=32×2=64) indicating the total number of bits of the data widths of the buses 130a and 130b.

Further, when the number of defective bits is the threshold or more, the defect number counter 200 obtains overflow information as a determination signal for determining that the number of defective bits is the threshold or more. As a more specific example, when the number of defective bits exceeds the number that can be expressed by n bits, the defect number counter 200 obtains a value indicating overflow (for example, a value of [1]) as overflow information. The defect number counter 200 includes the obtained overflow information in the defect information and outputs the defect information as test result data.

As a specific example, if the value n=2, the defect number counter 200 can count 0 to 3 defective bits. When the number of defective bits is 0 to 3, the defect number counter 200 obtains defect information including a value of 2 bits indicating the number of defective bits. The overflow information is a value (for example, a value of [0]) indicating that no overflow has occurred. Meanwhile, when the number of defective bits exceeds 3, the defect number counter 200 obtains overflow information of a value indicating overflow.

As described above, the defect number counter 200 functions as a defect information obtaining unit that obtains defect information indicating a defect when the defect is detected in the data read from the cell array 110. In addition, the defect number counter 200 obtains the number of defects in the defect information as a bit value from a least significant bit (LSB) to n bits.

FIG. 5 is a schematic diagram illustrating an example of test result data output according to the number of fails from the defect number counter 200 according to the embodiment in comparison with test result data by the compression circuit 120 according to the existing technology. In the example of FIG. 5, the value n=2, and the thresholds for overflow of the number of defective bits is four. That is, overflow occurs when the number of defective bits is four or more.

In FIG. 5, a column A shows examples of test result data according to the existing technology, and a column B shows examples of test result data according to the embodiment. In the examples of the existing technology shown in the column A, the test result data is a pass for the number of fails=0, and all the test result data is a fail for the number of fails of other than 0.

Meanwhile, in the examples of the embodiment shown in the column B, the defect information in the test result data is a pass (for example, the value of [0]) for the number of fails=0, and the defect information in the test result data is a value indicating the number of fails for the number of fails=1 to 3. When the number of fails is 4 or more, the overflow information in the test result data becomes a value of [overflow] indicating overflow.

That is, the defect number counter 200 according to the embodiment obtains the defect information for the number of fails=0 to $2^n-1$ as n-bit data. In addition, the defect number counter 200 sets the overflow information to a value of [overflow] indicating overflow when the number of fails is a threshold ($=2^n$) or more.

In the example of the value n=2, the defect number counter 200 obtains the number of defects with respect to the number of fails=0 to 3 as 2-bit data and also sets the overflow information to a value of [overflow] indicating overflow when the number of fails is the threshold (=4) or more. In a case where the overflow information is expressed by 1-bit data, the defect information becomes 3-bit test result data and is output to the outside by a signal line 141 having a 3-bit data width.

As described above, by applying the defect number counter 200 according to the embodiment, it is possible to deal with a test for a memory on which pass determination of all bits is not assumed. In addition, in case of the value n=2, the number of signal lines 141 that output the test result data may be only three, and the same number of measurements by the tester 20 may be gained.

Note that the value n can be appropriately set according to, for example, specifications for the MRAM 100a. For example, it is conceivable to set the value n according to the error correction capability by the ECC applied to the MRAM 100a.

Figure 6:
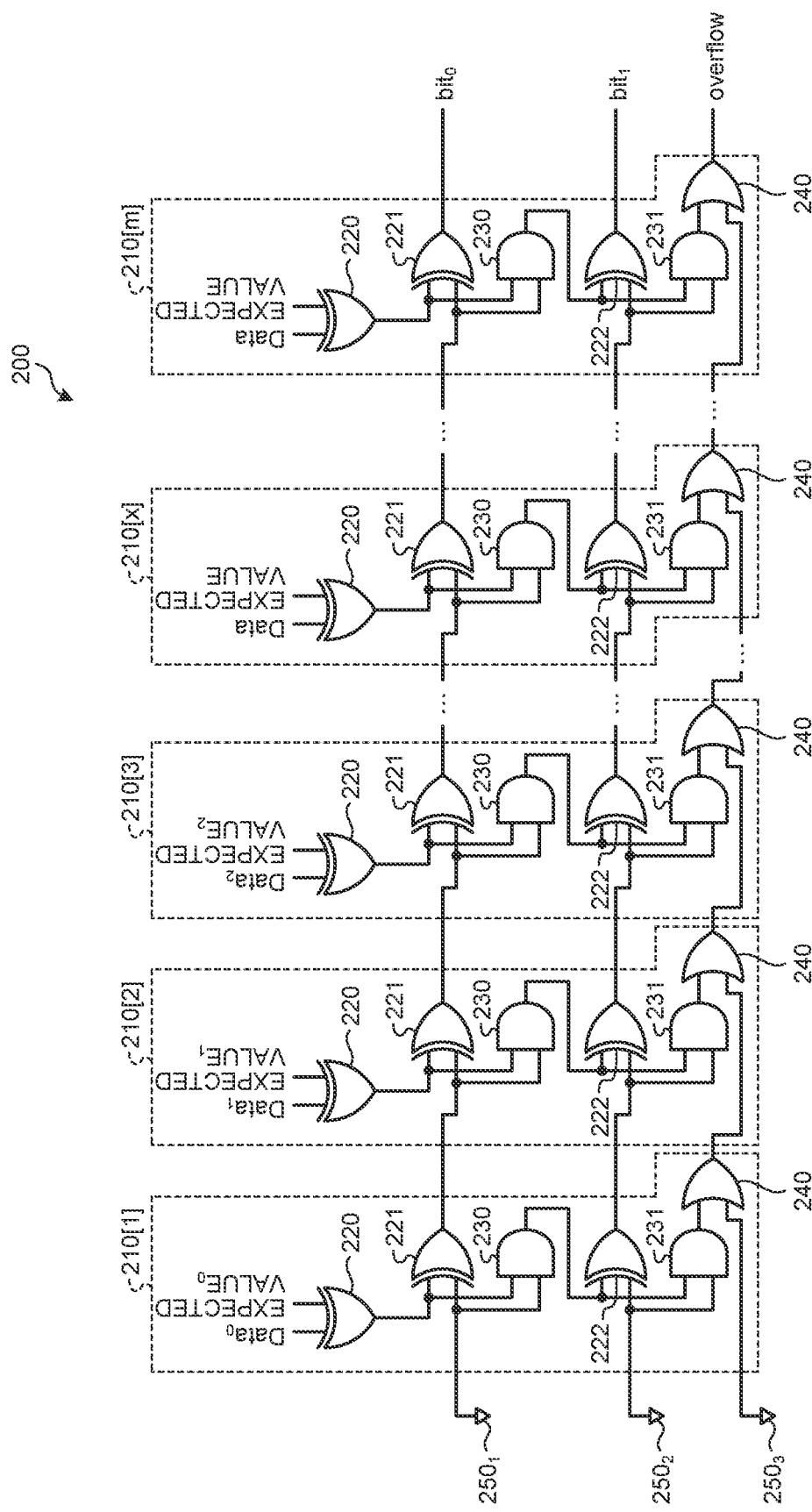
FIG. 6 is a circuit diagram illustrating a configuration of an example of the defect number counter according to the embodiment.

FIG. 6 is a circuit diagram illustrating a configuration of an example of the defect number counter 200 according to the embodiment. The defect number counter 200 illustrated in FIG. 6 is an example in a case where the data width is m bits and the threshold for overflow is [4].

In FIG. 6, the defect number counter 200 includes, for example, units $210_1, 210_2, 210_3, \ldots, 210_x, \ldots,$ and $210_m$ having the same configuration, the number of units corresponding to the number of bits of the data width (=m bits) in the IO of the MRAM 100a. That is, the defect number counter 200 is configured by repeatedly connecting each of the units $210_1$ to $210_m$ as a pattern for each bit of data read from the cell array 110.

Hereinafter, when there is no need to particularly distinguish the units $210_1$ to $210_m$, the unit $210_x$ is described as an arbitrary unit among the units $210_1$ to $210_m$ as appropriate. Also, when there is no need to particularly distinguish the units $210_1$ to $210_m$, each of the units $210_1$ to $210_m$ may be representatively described as the unit 210. Furthermore, in FIG. 6, a direction on the right side of the figure is a rear stage, and a direction on the left side is a front stage. Furthermore, in the following description, it is assumed that the value of [1] corresponds to the high state of the signal, and the value of [0] corresponds to the low state of the signal.

The unit $210_x$ includes three XOR circuits 220, 221, and 222, two AND circuits 230 and 231, and one OR circuit 240.

In the XOR circuit 220, data of [x] at a bit position x among the bits of the buses 130a and 130b is input to one input terminal, and an expected value of [x] corresponding to the corresponding data of [x] is input to the other input terminal.

Here, the expected value of [x] according to the embodiment indicates a value expected for the data of [x] at the bit position x. For example, a predetermined value (for example, the value of [1]) is written in advance in each memory cell included in each cell array 110 of the MRAM 100a prior to counting the number of defects by the defect number counter 200. In this case, the data read from each memory cell is expected to be equal to the corresponding predetermined value. The predetermined value in this case is the expected value of [x]. That is, the expected value in the embodiment is a value of a concept different from the expected value in the probability.

FIG. 7 is a schematic diagram illustrating a truth table based on expected values and data according to the embodiment. As illustrated in FIG. 7, a pass is determined when the expected value and the data match, and a fail is determined when the expected value and the data are different. The XOR circuit 220 outputs a value of [0] as a value indicating a pass and outputs a value of [1] as a value indicating a fail.

In the unit $210_x$, the XOR circuit 220 outputs the value of [0] when the expected value of [x] and the data of [x] match, and outputs the value of [1] when the expected value of [x] and the data of [x] are different. As described above, the XOR circuit 220 functions as a comparator that compares the data of [x] read from the cell array 110 with the expected value of [x] set for the corresponding data of [x]. When the output of the XOR circuit 220 indicates the value of [1], it can be determined that the memory cell corresponding to the corresponding data of [x] among the memory cells to be inspected is defective. As described above, when the expected value of [x] and the data of [x] are different, the XOR circuit 220 sets the output to the value of [1] and activates the signal indicating that the data of [x] is defective.

In the unit $210_x$, the output of the XOR circuit 220 is input to one input terminal of each of the XOR circuit 221 and the AND circuit 230 of the unit $210_x$. The output of the XOR circuit 221 in the unit $210_{x-1}$ in the front stage is input to the other input terminal of each of the XOR circuit 221 and the AND circuit 230. Note that, in the unit $210_1$ in the first stage in FIG. 6, the value of [0] is input from a terminal $250_1$ to the other input terminal of the corresponding XOR circuit 221. Similarly, in the unit $210_1$, a value of [0] is input from a terminal $250_2$ to the other input terminal of the XOR circuit 222 described below.

The output of the XOR circuit 221 in the unit $210_x$ is input to the other input terminal of the XOR circuit 221 in the unit $201_{x+1}$ at the rear stage. When the unit $210_x$ is the unit $210_m$ at the last stage, the output of the XOR circuit 221 is output from the defect number counter 200 as the value of the zeroth bit (bit of [0]) of the defect number counter 200.

The output of the XOR circuit 221 in the unit $210_x$ is as follows.

(1) The XOR circuit 221 outputs the value of [0], when the expected value of [x] matches the data of [x] and the output of the XOR circuit 221 in the unit $210_{x-1}$ at the front stage (the terminal $250_1$ in the unit $210_1$) is the value of [0].

(2) The XOR circuit 221 outputs the value of [1], when the expected value of [x] matches the data of [x] and the output of the XOR circuit 221 (in a case other than the unit $210_1$) in the unit $210_{x-1}$ at the front stage is the value of [1].

(3) The XOR circuit 221 outputs the value of [1] when the expected value of [x] and the data of [x] are different and the output of the XOR circuit 221 in the unit $210_{x-1}$ at the front stage is the value of [0].

(4) The XOR circuit 221 outputs the value of [0] when the expected value of [x] and the data of [x] are different and the output of the XOR circuit 221 in the unit $210_{x-1}$ at the front stage is the value of [1].

The output of the AND circuit 230 in the unit $210_x$ is as follows.

(1) The AND circuit 230 outputs the value of [0], when the expected value of [x] matches the data of [x] and the output of the XOR circuit 221 in the unit $210_{x-1}$ at the front stage (the terminal $250_1$ in the unit $210_1$) is the value of [0].

(2) The AND circuit 230 outputs the value of [0], when the expected value of [x] matches the data of [x] and the output of the XOR circuit 221 (in a case other than the unit $210_1$) in the unit $210_{x-1}$ at the front stage is the value of [1].

(3) The AND circuit 230 outputs the value of [0] when the expected value of [x] and the data of [x] are different and the output of the XOR circuit 221 in the unit $210_{x-1}$ at the front stage is the value of [0].

(4) The AND circuit 230 outputs the value of [1] when the expected value of [x] and the data of [x] are different and the output of the XOR circuit 221 in the unit $210_{x-1}$ at the front stage is the value of [1].

In the unit $210_x$, the output of the AND circuit 230 is input to one input terminal of each of the XOR circuit 222 and the AND circuit 231 in the unit $210_x$. The output of the XOR circuit 222 in the unit $210_{x-1}$ in the front stage is input to the other input terminal of each of the XOR circuit 222 and the AND circuit 231. Note that, in the unit $210_1$ in the first stage in FIG. 6, the value of [0] is input from the terminal $250_1$ to the other input terminal of the corresponding XOR circuit.

The XOR circuit 222 and the AND circuit 231 in the unit $210_x$ operate similarly to the XOR circuit 221 and the AND circuit 230 described above using the output of the AND circuit 230 and the output of the XOR circuit 222 in the unit $210_{x-1}$ at the front stage as inputs.

That is, the output of the XOR circuit 222 in the unit $210_x$ is input to the other input terminal of the XOR circuit 222 in the unit $201_{x+1}$ at the rear stage. When the unit $210_x$ is the unit $210_m$ at the last stage, the output of the XOR circuit 222 is output from the defect number counter 200 as the value of the 1-th bit (bit of [1]) of the defect number counter 200.

In the defect number counter 200, the AND circuit 230 in the unit $210_x$ outputs the value of [1], when the expected value of [x] and the data of [x] are different and the expected value and the data are different in any unit 210 at the front stage of the unit $210_x$. Furthermore, the AND circuit 231 in the unit $210_x$ outputs the value [1], when the output of the AND circuit 230 is the value [1] and the output of the AND circuit 230 and the output of the XOR circuit 222 are different in any unit 210 at the front stage of the unit $210_x$.

That is, in the unit $210_x$, the number of cases where the expected value and the data are different in each unit 210 in the front stage of the unit $210_x$ including the corresponding unit $210_x$, that is, the number of defects is added. As the added number of defects, the value at the zeroth bit and the value at the 1-th bit are output, as binary values, from the XOR circuit 221 and the XOR circuit 222, respectively.

In the unit $210_x$, the output of the AND circuit 231 is input to one input terminal of the OR circuit 240. The output of the OR circuit 240 in the unit $210_{x-1}$ in the front stage is input to the other input terminal of the OR circuit 240. Here, in the unit $210_1$ in the first stage in FIG. 6, the value of [0] is input from a terminal $250_3$ to the other input terminal of the corresponding OR circuit 240. When the unit $210_x$ is the unit $210_m$ at the last stage, the output of the OR circuit 240 is output from the defect number counter 200 as the overflow information of [overflow] of the defect number counter 200.

That is, when the output of the AND circuit 231 is the value of [1] in at least one unit 210 among the units $210_1$ to $210_m$, overflow information of [overflow] of the value of [1] is output from the OR circuit 240 of the unit $210_m$ at the last stage.

As described above, the overflow information of [overflow] becomes the value of [1] when the digit overflow occurs in the AND circuits 230 and 231 in at least one unit 210 among the units $210_1$ to $210_m$. Therefore, the output of the OR circuit 240 in the unit $210_m$ at the last stage can be considered as the second bit (most significant bit) of the test result data together with the zeroth bit (bit of [0]) and the first bit (bit of [1]). Since the value of the most significant bit is output by the OR circuit 240 connected in series through each of the units $210_1$ to $210_m$, after the value is incremented to the value of [1], the value is not inverted even when addition due to a defect is further performed.

Figure 8:
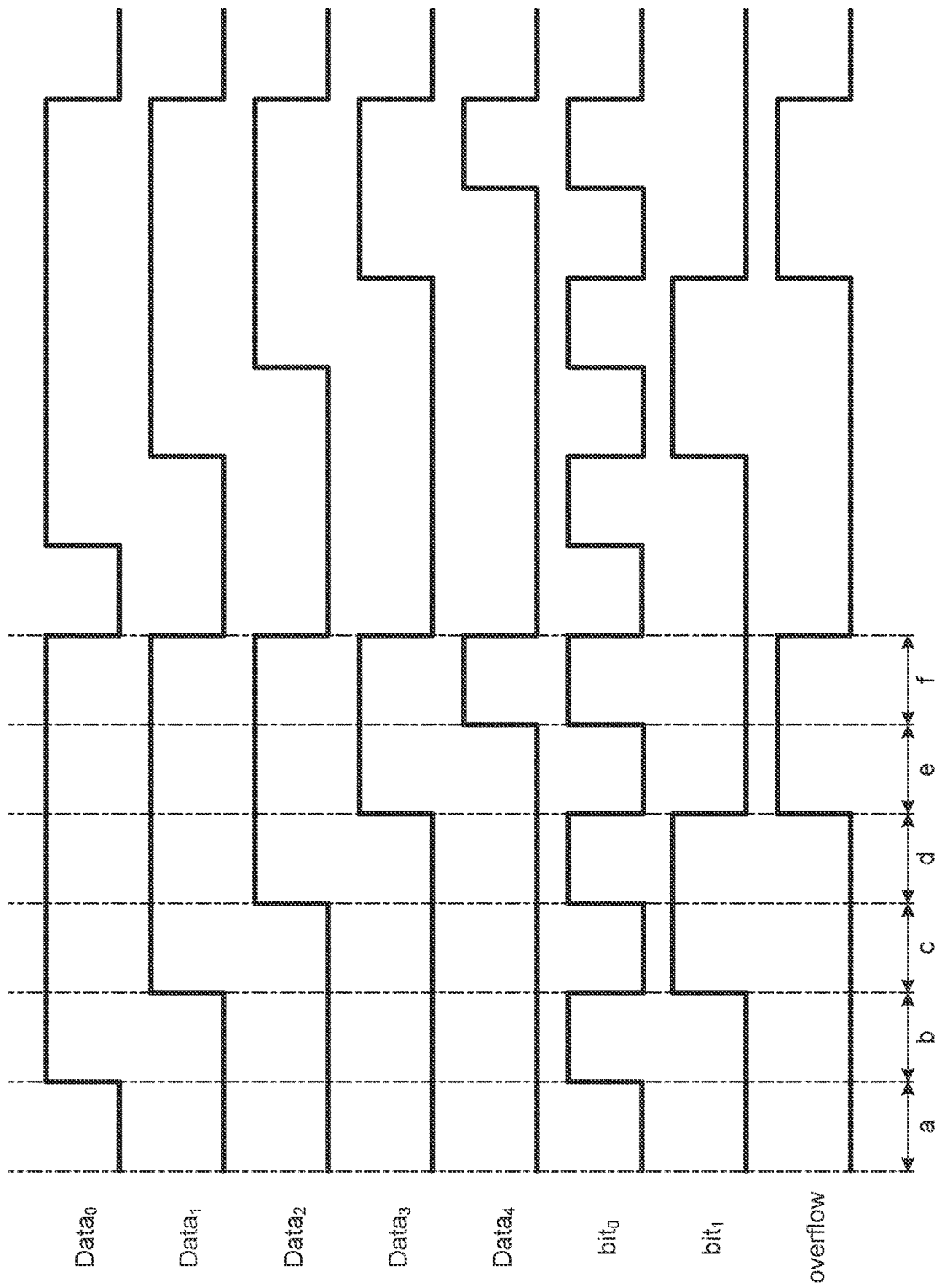
FIG. 8 is a schematic diagram illustrating a result of an example in which the operation of the defect number counter according to the embodiment is simulated.

FIG. 8 is a schematic diagram illustrating a result of an example in which the operation of the defect number counter 200 having the configuration illustrated in FIG. 6 according to the embodiment is simulated. Note that, FIG. 8 illustrates an example of a case where the value m=5, the value n=2, and the threshold for overflow is [4]. That is, FIG. 8 is an example illustrating a simulation result in a case where five units 210 are connected in the configuration of FIG. 6. In each waveform of FIG. 8, a high state indicates a value of [1], and a low state indicates a value of [0]. In addition, it is assumed that an expected value of [0] (Low) is input to each unit 210.

Reference symbols a to f in the figure indicate states corresponding to combinations of data of [0] to [4] input to the five units 210. The reference symbol a indicates the value of [0] (Low) of any of the data of [0] to [4], that is, the pass state. Reference symbols b to f respectively indicate that one to four items among the data of [1] to [4] are a value of [1], that is, the fail state.

The defect number counter 200 counts the number of defects when the value (data of [0] to [4]) read from each memory cell is different from the expected value of [0], and the count result is output in binary from the zeroth bit (bit of [0]) and the first bit (bit of [1]). It is understood that, when the number of fails is equal to or more than four, that is the threshold, the overflow information of [overflow] has the value of [1]. That is, when the overflow information of [overflow] is the second bit with respect to the zeroth bit and the first bit, the count result is fixed to the threshold of [4] when the number of fails is four or more.

In this manner, the defect number counter 200 as a whole configures, for example, an adder that adds the number of defects in each bit read at the same time of the data width (=m bits) in the IO of the MRAM 100a. In addition, the adder outputs a different value for each number of defects when the added number of defects is 0 or less than the threshold, and the addition result of the number of defects is fixed to the threshold when the number of defects is the threshold or more.

As described above, by applying the defect number counter 200 according to the embodiment, the number of defects can be counted in a test of a memory such as an MRAM or a ReRAM on which a pass of all bits is not assumed. At this time, since the defect number counter 200 according to the embodiment can output the information on the number of fails with the number of bits smaller than the data width of the IO of the memory, the same number of measurements of the test can be gained, and the test time can be shortened. Therefore, while the number of defects can be counted, the number of terminals for outputting the test result data to the tester 20 can be reduced.

Further, since the defect number counter 200 according to the embodiment is configured by a repeated pattern in which the unit 210 is repeated for each IO (for each bit), the expansion is easy according to the data width of the IO. Furthermore, in the unit 210, the number of counts of the number of defects and the threshold can be changed by adding a combined circuit of the XOR circuit 221 and the AND circuit 230.

4. FIRST MODIFICATION OF EMBODIMENT

Next, a first modification of the embodiment of the present disclosure is described. The first modification of the embodiment is an example in which IOs in a memory are grouped, and an expected value is set in the defect number counter 200 according to the grouped group.

4-1. First Example of First Modification of Embodiment

Figure 9:
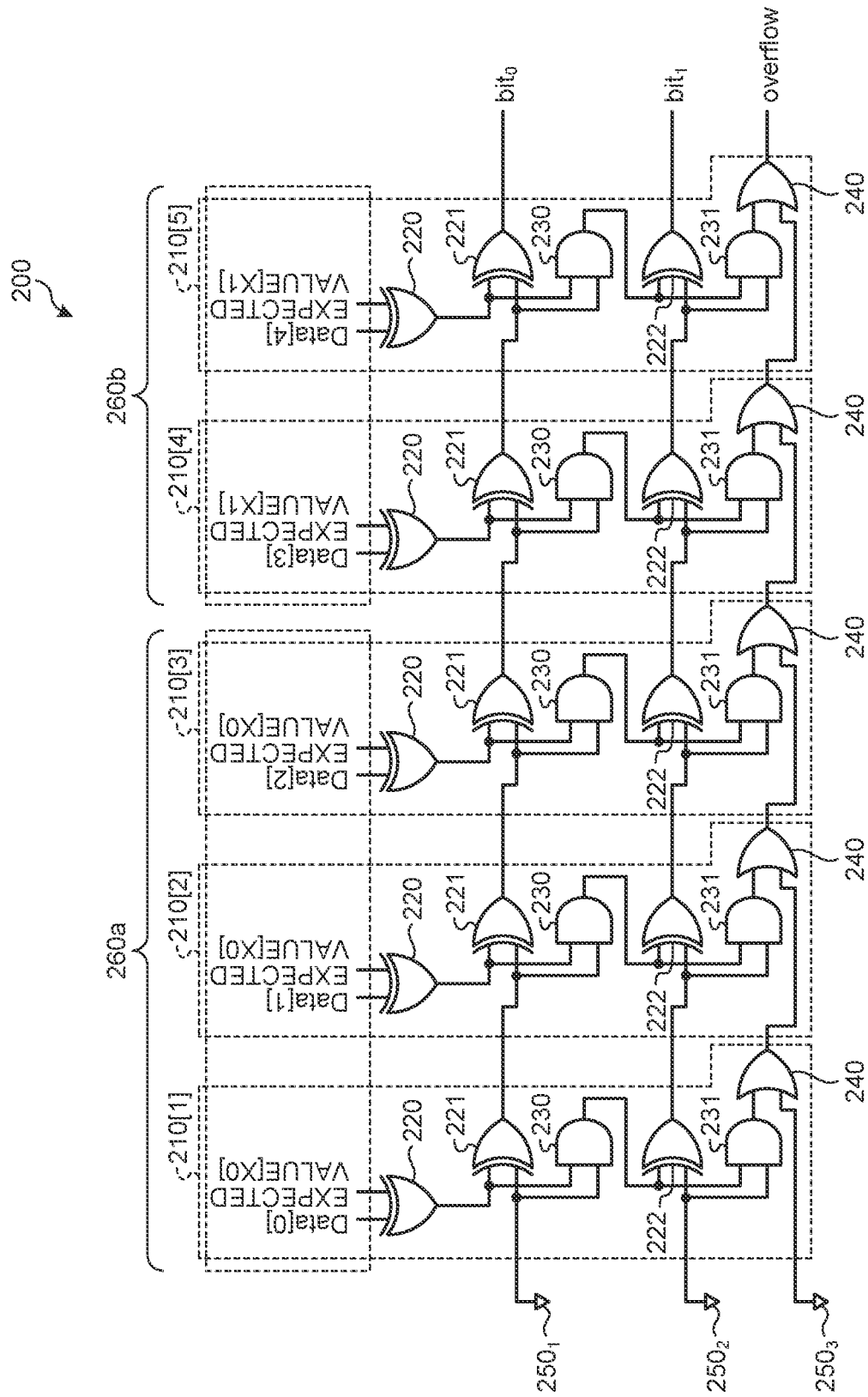
FIG. 9 is a schematic diagram illustrating a first example of a first modification of the embodiment.

First, 4-1. a first example of the first modification of the embodiment is described. FIG. 9 is a schematic diagram illustrating the first example of the first modification of the embodiment. FIG. 9 illustrates a configuration example of the defect number counter 200 in a case where the value m=5, the value n=2, and the threshold for overflow is [4].

In the example of FIG. 9, in this configuration, bits of the IO are grouped into two groups of a group 260a of the data of [0] to [2] and a group 260b of the data of [3] and [4].

In the example of FIG. 9, an expected value of [X0] (for example, the value of [0]) is input to the XOR circuit 220 of the units $210_1$ to $210_3$ corresponding to the group 260a. Meanwhile, an expected value of [X1] (for example, a value of [1]) different from the expected value of [X0] is input to the XOR circuits 220 of the units $210_4$ and $210_5$ corresponding to the group 260b.

In the example of FIG. 9, grouping is performed between adjacent bits of the IO, but this is not limited to this example. For example, in the IO, grouping can be performed into a group of odd-numbered bits and a group of even-numbered bits. The present invention is not limited thereto, and the grouping may be performed according to a combination of arbitrary bits in the IO.

4-2. Second Example of First Modification of Embodiment

Next, a second example of the first modification of the embodiment is described. In the first example of the first modification of the embodiment described above, the bits of the IO are grouped based on the hardware configuration. Meanwhile, in the second example of the first modification of the embodiment, the bits of the IO are grouped based on the logical configuration of the memory, and the expected value is set according to the group.

Figure 10:
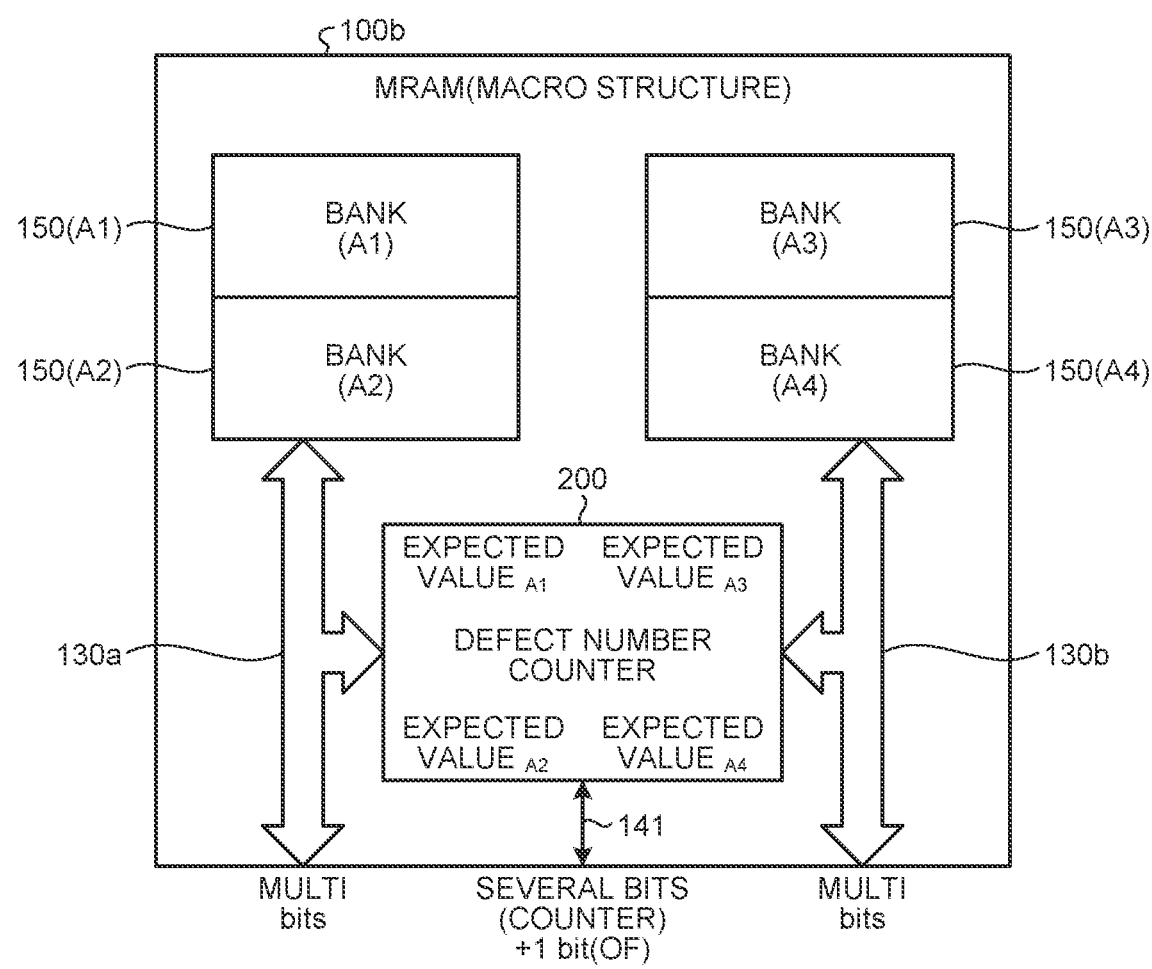
FIG. 10 is a schematic diagram illustrating a second example of the first modification of the embodiment.

FIG. 10 is a schematic diagram illustrating the second example of the first modification of the embodiment. In FIG. 10, the MRAM 100b (macro structure) includes four banks 150 (A1), 150 (A2), 150 (A3), and 150 (A4) as logical configurational units of the storage area. It can be considered that these banks 150 (A1), 150 (A2), 150 (A3), and 150 (A4) are obtained by grouping the cell array 110 based on a logical configuration. In the second example, each of the banks 150 (A1), 150 (A2), 150 (A3), and 150 (A4) is treated as a group, and expected values are set according to the groups.

In the example of FIG. 10, an expected value of [A1] is set for the group by the IO corresponding to the bank 150 (A1), and an expected value of [A2] is set for the group by the IO corresponding to the bank 150 (A2). In addition, an expected value of [A3] is set for the group by the IO corresponding to the bank 150 (A3), and an expected value of [A4] is set for the group by the IO corresponding to the bank 150 (A4). In this case, as an example, various combinations of expected values for each group can be considered such that the expected values of [A1] and [A3] each are the value of [0], and the expected values of [A2] and [A4] each are the value of [1].

As described in the first example and the second example of the first modification of the embodiment, in the defect number counter 200, the expected values are set according to the groups into which bits of the IO are grouped, so that a more detailed test can be performed.

5. SECOND MODIFICATION OF EMBODIMENT

Next, a second modification of the embodiment is described. In the embodiment described above, in the MRAM 100a, the terminal of the IO of the memory and the terminal for the defect number counter 200 to output the test result data are separately provided. Meanwhile, in the second modification of the embodiment, the terminal of the IO of the memory and the terminal for outputting the test result data are shared.

Figure 11:
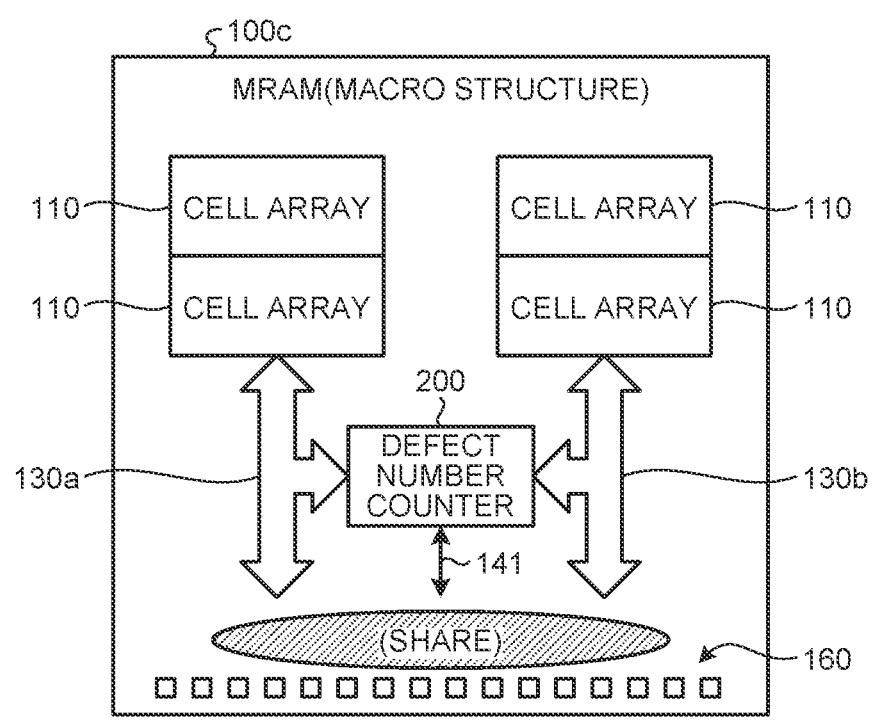
FIG. 11 is a schematic diagram illustrating a second modification of the embodiment.

FIG. 11 is a schematic diagram illustrating the second modification of the embodiment. In FIG. 11, in the MRAM 100c, the buses 130a and 130b share a terminal group 160 including the plurality of terminals with the IO with respect to 30b and the signal line 141 to which the test result data of the defect number counter 200 is output. For example, in the MRAM 100c, bits of the IO are respectively connected to the plurality of terminals included in the terminal group 160, and bits of the signal line 141 are connected to an arbitrary terminal among the plurality of terminals included in the terminal group 160.

In this manner, by sharing the terminal of the IO of the memory and the test result output terminal, the total number of terminals of the MRAM 100c can be reduced.

Note that, in the above description, an example has been described in which the technology according to the embodiment is applied to a single semiconductor storage device, but the technology according to the embodiment is also applicable to a semiconductor storage device having another configuration. For example, the technology according to the embodiment can be applied to the mixed memory 30 described with reference to FIG. 2B. In this case, the defect number counter 200 described in the embodiment is provided to the memory 10b mounted in the mixed memory 30.

Furthermore, in the above description, it has been described that the technology according to the embodiment is applied to a semiconductor storage device such as an MRAM or a ReRAM on which all bits pass is not assumed, but the present disclosure is not limited to this example. That is, the technology according to the embodiment can also be applied to a semiconductor storage device in an assumption that all bits pass such as DRAM.

Furthermore, the effects described in the present specification are merely examples and are not limited, and other effects may be provided.

Note that the present technology can also have the following configurations.

(1) A semiconductor storage device comprising:
  a memory cell array including a plurality of memory cells;
  a read data output unit that outputs data read from the memory cell array to the outside with a bit width of m bits without changing the data; and
  a defect information obtaining unit that obtains defect information indicating a defect when the defect is detected in the data read from the memory cell array,
  wherein the defect information obtaining unit outputs the defect information, in which the number of defects in the data read from the memory cell array is 0 to n bits (n<m) bits, for outputting different values to the outside for each number of defects, with 2 to n bit values indicating 1-bit information, respectively.

(2) The semiconductor storage device according to the above (1),
  wherein the defect information obtaining unit obtains bit values of the number of bits from a least significant bit (LSB) to the n bits among bit values indicating the number of defects.

(3) The semiconductor storage device according to the above (2), wherein the defect information obtaining unit outputs a determination signal when the number of defects exceeds the number that can be expressed by the n bits.

(4) The semiconductor storage device according to any one of the above (1) to (3),
wherein the defect information obtaining unit does not invert the value of the most significant bit when a defect is further detected in a state where the value of the most significant bit in the defect information is incremented.

(5) The semiconductor storage device according to any one of the above (1) to (4),
wherein the defect information obtaining unit includes an adder that counts defects included in the data simultaneously read from the memory cell array.

(6) The semiconductor storage device according to the above (5),
wherein the adder includes a repeated pattern for each bit of the data read from the memory cell array.

(7) The semiconductor storage device according to any one of the above (1) to (6),
wherein the defect information obtaining unit includes a comparator that compares the data read from the memory cell array with an expected value set in advance for the read data and
activates a signal indicating that the read data is defective when a comparison result by the comparator indicates that the read data is different from the expected value.

(8) The semiconductor storage device according to the above (7),
wherein the defect information obtaining unit sets the expected value according to each of a plurality of groups obtained by grouping the data simultaneously read from the memory cell array.

(9) The semiconductor storage device according to the above (7),
wherein the defect information obtaining unit sets the expected value according to each of a plurality of groups obtained by grouping the memory cell array based on a logical configuration.

(10) The semiconductor storage device according to any one of the above (1) to (9),
wherein the defect information obtaining unit shares an output terminal for outputting the defect information with an output terminal for outputting data by the read data output unit.

(11) The semiconductor storage device according to any one of the above (1) to (10), further comprising:
a logic circuit connected to the read data output unit.

(12) The semiconductor storage device according to any one of the above (1) to (11),
wherein the memory cell uses a variable-resistance element as a storage element that stores data.

(13) The semiconductor storage device according to any one of the above (1) to (12),
wherein the memory cell uses a magnetoresistive element as a storage element that stores data.

REFERENCE SIGNS LIST 10, 10a, 10b MEMORY
20 TESTER
30 MIXED MEMORY
50, 160 TERMINAL GROUP
60 IO
100, 100a, 100b, 100c MRAM
110 CELL ARRAY
120 COMPRESSION CIRCUIT
130a, 130b BUS
140, 141 SIGNAL LINE
150 (A1), 150 (A2), 150 (A3), 150 (A4) BANK
200 DEFECT NUMBER COUNTER
$210_1, 210_2, 210_3, 210_4, 210_5, 210_x, 210_m$ UNIT
220, 221, 222 XOR CIRCUIT
230, 231 AND CIRCUIT
240 OR CIRCUIT
$250_1, 250_2, 250_3$ TERMINAL
260a, 260b GROUP

The invention claimed is:

1. A semiconductor storage device, comprising:
a memory that includes a memory cell array, wherein
the memory cell array includes a plurality of memory cells, and
the memory is configured to read data from the memory cell array;
a read data output unit configured to output the read data with no change, wherein the read data has a bit width of m bits; and
a defect information obtaining unit configured to:
detect at least one of a plurality of defects in the read data;
obtain defect information indicating the at least one of the plurality of defects; and
output the defect information, wherein the defect information obtaining unit includes an adder that is configured to:
determine a number of defects of the plurality of defects in the read data; and
control the number of defects such that the number of defects is less than or equal to a threshold value, wherein
the number of defects in the read data is 0 to n bits,
n is less than m,
the defect information includes a respective value for each of the plurality of defects,
the respective value for each of the plurality of defects corresponds to 2 to n bit values, and
each of the 2 to n bit values indicates 1-bit information for the each of the plurality of defects.

2. The semiconductor storage device according to claim 1, wherein the defect information obtaining unit is further configured to obtain a plurality of bit values from a least significant bit (LSB) to the n bit values that indicates the number of defects.

3. The semiconductor storage device according to claim 2, wherein
the defect information obtaining unit is further configured to output a determination signal based on the number of defects that exceeds the threshold value, and
the threshold value is associated with the n bits.

4. The semiconductor storage device according to claim 1, wherein the defect information obtaining unit is further configured to:
detect the at least one of the plurality of defects based on an increment of a value of a most significant bit, wherein the defect information includes the value of the most significant bit; and
maintain the value of the most significant bit based on the increment of the value of the most significant bit.

5. The semiconductor storage device according to claim 1, wherein the adder is further configured to determine the number of defects included in the read data simultaneously read from the memory cell array.

6. The semiconductor storage device according to claim 5, wherein the adder includes a repeated pattern for each bit of the read data from the memory cell array.

7. The semiconductor storage device according to claim 1, wherein the defect information obtaining unit further includes a comparator that is configured to:
   set an expected value for the read data;
   compare the read data with the expected value for the read data;
   generate, based on the comparison, a comparison result that indicates a difference between the read data and the expected value; and
   activate a signal indicating that the read data is defective based on the comparison result, wherein the comparison result indicates that the read data is different from the expected value.

8. The semiconductor storage device according to claim 7, wherein
   the defect information obtaining unit is further configured to set the expected value based on each of a plurality of groups of the read data, and
   the read data is simultaneously read from the memory cell array.

9. The semiconductor storage device according to claim 7, wherein
   the defect information obtaining unit is further configured to set the expected value based on each of a plurality of groups of the read data, and
   the read data is grouped in the plurality of groups based on a logical configuration.

10. The semiconductor storage device according to claim 1, wherein
    an output terminal of the defect information obtaining unit shares with an output terminal of the read data output unit,
    the defect information obtaining unit is further configured to output the defect information through the output terminal of the defect information obtaining unit, and
    the read data output unit is further configured to output the read data through the output terminal of the read data output unit.

11. The semiconductor storage device according to claim 1, further comprising a logic circuit connected to the read data output unit.

12. The semiconductor storage device according to claim 1, wherein each of the plurality of memory cells is configured to store the read data in a variable-resistance element as a storage element.

13. The semiconductor storage device according to claim 1, wherein each of the plurality of memory cells is configured to store the read data in a magnetoresistive element as a storage element.

* * * * *